March 20, 1928.
J. N. WHITEHOUSE
SLEEPING DOLL
Filed Oct. 28, 1925
1,663,324
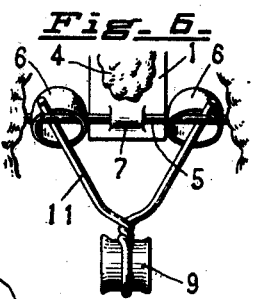
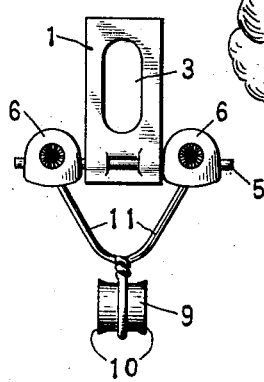
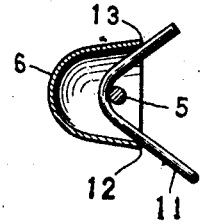
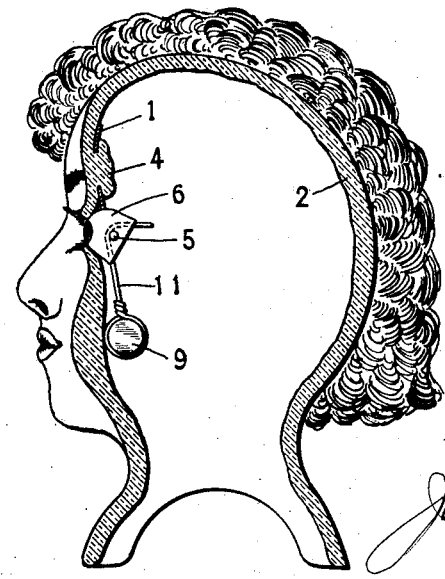
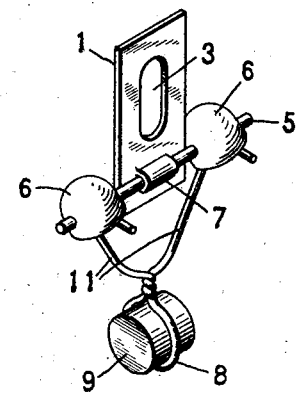
INVENTOR
John N. Whitehouse
BY
Frank Kent
ATTORNEY Patented Mar. 20, 1928.

1,663,324

UNITED STATES PATENT OFFICE.

JOHN N. WHITEHOUSE, OF NEW YORK, N. Y., ASSIGNOR TO MARKON MFG. CO. INC., OF NEW YORK, N. Y., A CORPORATION OF NEW YORK.

SLEEPING DOLL.

Application filed October 28, 1925. Serial No. 65,283.

This invention relates to sleeping dolls, and has for its object the improvement of the eye mechanism of such dolls.

In practicing this invention a member is provided which acts as a supporting member for the eye mechanism, and also as a spacing means for the eyes. Another member is provided for retaining the eyes in proper position, for suspending the weight which causes the eyes to operate by gravity, and for causing the eyes to move with the weight.

Other features of the invention will appear from the following detailed description.

In the drawings, in which a preferred embodiment of the invention has been selected for illustration, Figure 1 is a front elevation of a doll head embodying the invention.

Figure 2 is a cross-section of said head.

Figure 3 is a front elevation of the eye mechanism.

Figure 4 is a view showing a detail of the eye mechanism.

Figure 5 is a perspective view of the eye mechanism. Fig. 6 is a rear view of the eye mechanism as mounted.

Referring more particularly to the drawings, 1 is the supporting member for the eye mechanism which is attached to the head 2 by forcing the material from which the head is formed through the opening 3 formed in plate 1 and causing said material to mushroom as shown at 4. The shaft 5, upon which the eyes 6 are rotatably mounted, is held upon the plate by the struck-up portion 7.

The wire 8 is twisted about the lead weight 9, and the weight is further retained in the loop by upsetting the ends of the weight as shown at 10. Each of the two free ends of the wire, shown at 11, is passed around shaft 5 within one of the cup-shaped eyes 6, the wire being bent at such an angle that it contacts with the rim of the eye cup at two points on opposite sides of the shaft, as indicated at 12 and 13.

It will be noted that the plate 1 acts as a supporting member for the eye mechanism and also as a spacing member for the eyes. It will also be apparent that the wire 8 retains the eyes upon the shaft, carries the weight, and causes the eyes to move with the weight without appreciable lost motion.

Upon an inspection of Figure 2 it will be seen that when the doll is placed in a horizontal position the weight 9 will cause the eyes to rotate in a contra-clockwise direction, producing the appearance of closed eyelids.

The shaft 5 is loosely held in the struck-up portion 7 but is laterally restrained by reason of the fact that the eye assembly fits into a socket in the doll head, the walls of the socket contacting with the ends of the shaft.

The eye mechanism herein described may be described as a loose assembly, since it avoids the use of closely fitted bearings or other parts requiring accurate workmanship. The parts are made from low-cost materials and can be assembled by unskilled labor.

What I claim is:

1. An eye mechanism for dolls comprising an attaching plate, a shaft carried by said plate, a hollow eye open at the rear mounted on said shaft on either side of said plate, a weight, a wire secured to said weight and having two extending ends, one of said ends being bent around said shaft inside of one of said eyes at such an angle that the wire touches each side of the eye and engages the inner surface of the shaft at a point inside the eye.

2. The combination of a pair of hollow cup-shaped eyes, a shaft passing through a pair of apertures formed in each eye, a member passing into the open end of each eye into engagement with the inner portion of the shaft, said member engaging opposite sides of the rim of the eye to cause the eye to follow pivotal movements of the member relative to the shaft, and a weight attached to the member to gravitatively control movement of the eyes.

In testimony whereof I affix my signature.

JOHN N. WHITEHOUSE.